Feb. 1, 1955  F. J. KUNZ  2,701,145
DRAFT GEAR FOR ROAD VEHICLES
Filed Jan. 24, 1951  3 Sheets-Sheet 1
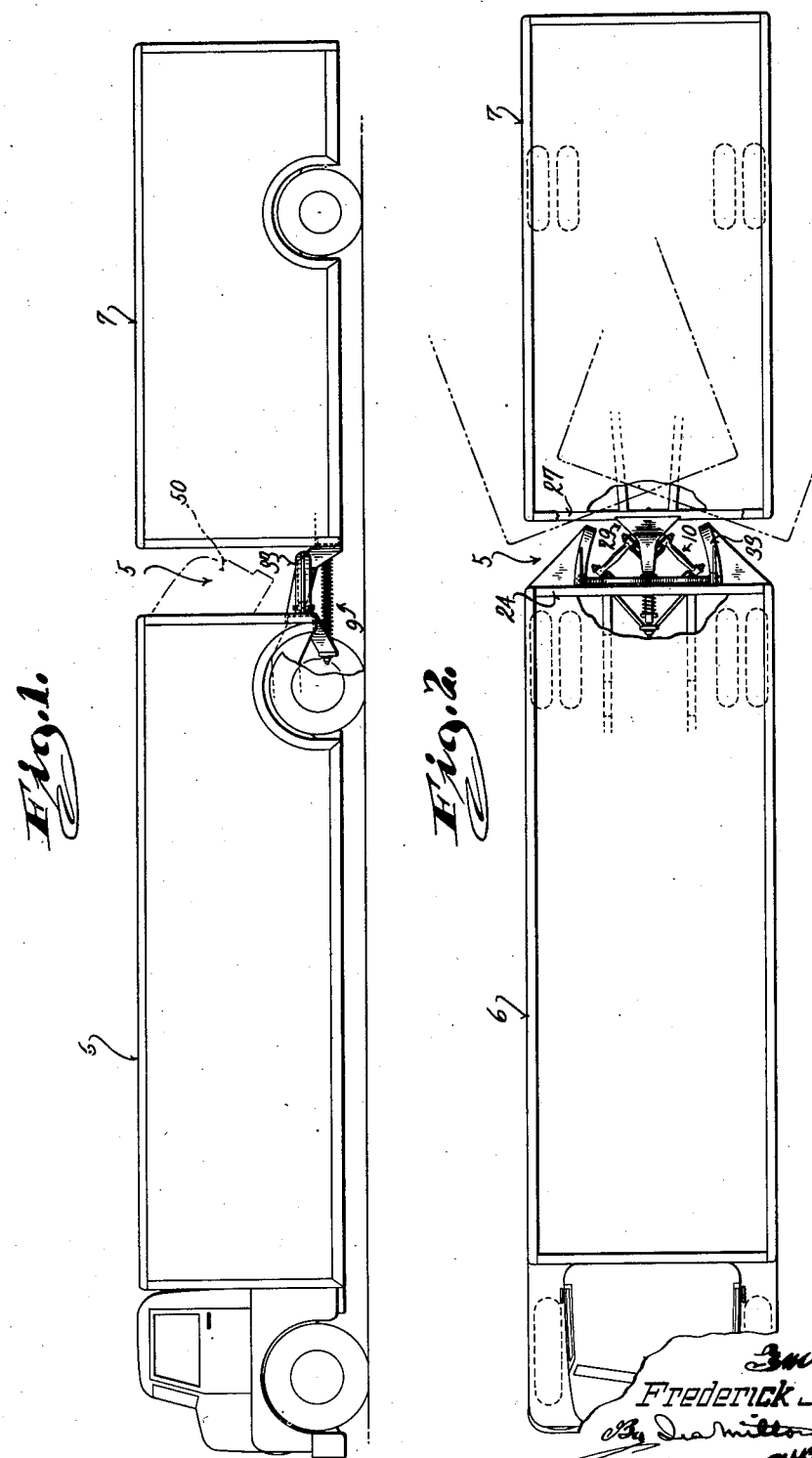
Inventor
Frederick J. Kunz
By Ira Milton Jones
attorney Feb. 1, 1955  F. J. KUNZ  2,701,145
DRAFT GEAR FOR ROAD VEHICLES
Filed Jan. 24, 1951  3 Sheets-Sheet 2
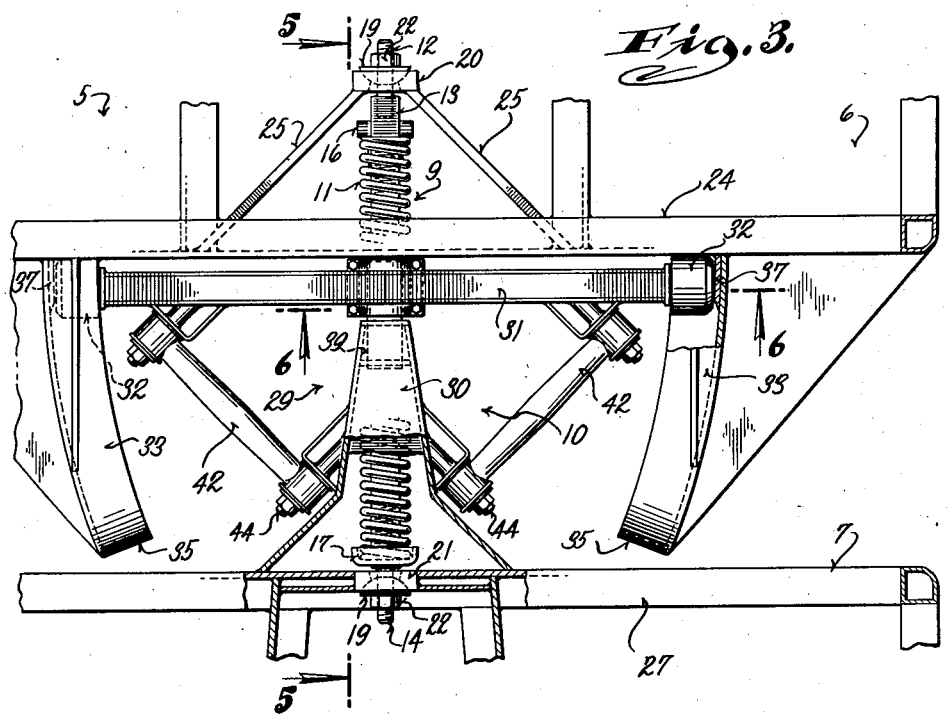
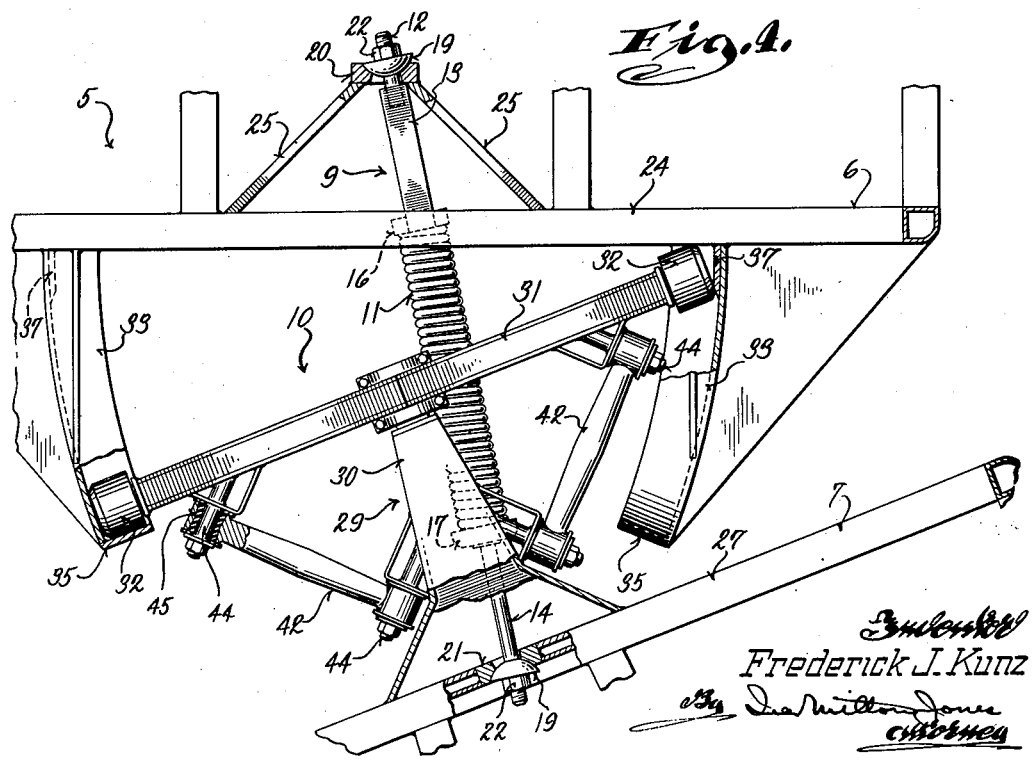
Frederick J. Kunz Feb. 1, 1955 F. J. KUNZ 2,701,145
DRAFT GEAR FOR ROAD VEHICLES
Filed Jan. 24, 1951 3 Sheets-Sheet 3
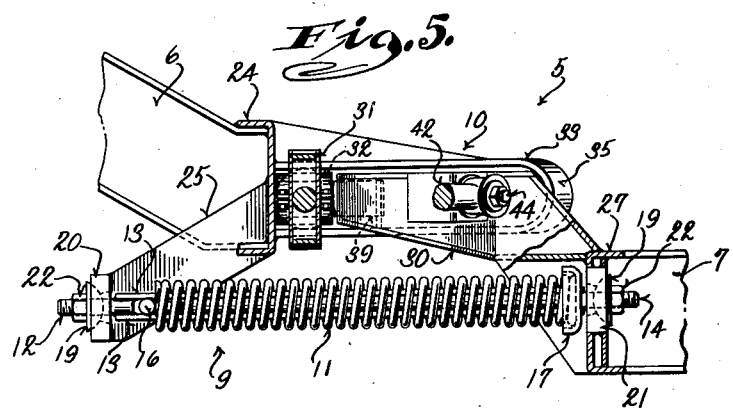
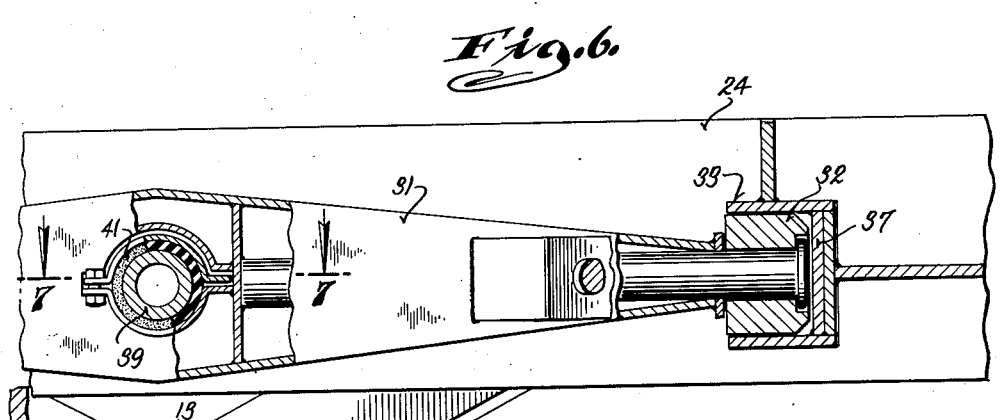
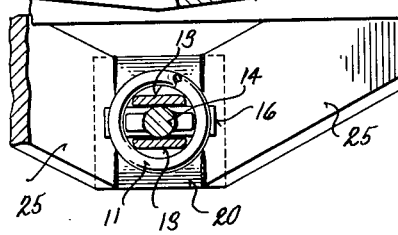
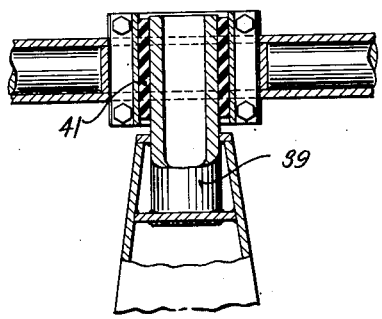
Inventor
Frederick J. Kunz

United States Patent Office 2,701,145
Patented Feb. 1, 1955

2,701,145

DRAFT GEAR FOR ROAD VEHICLES

Frederick J. Kunz, Fort Jennings, Ohio, assignor to Car Carrier Equipment Company, Chicago, Ill., a corporation of Illinois Application January 24, 1951, Serial No. 207,609

10 Claims. (Cl. 280—446)

This invention relates to improvements in draft gear for coupling together two road vehicles, and has more particular reference to draft gear which is especially well suited for coupling the vehicles with a minimum of space between their coupled ends.

The main purpose of this invention is to provide draft gear for close coupling two road vehicles and which will effect a degree of longitudinal separation between the vehicles during turning to assure turning clearance therebetween while minimizing side throw of the trailing vehicle in negotiating turns.

This invention accomplishes these purposes through the provision of draft gear having a longitudinally extensible draw bar through which the trailing vehicle is pulled, and embodying turn controlling mechanism independent of the drawbar which constrains the trailing vehicle to swinging motion relative to the pulling vehicle about a pivot spaced a distance laterally to that side of the drawbar closest to the center of the turn regardless of the direction of the turn.

More specifically, the invention resides in the provision of draft gear comprising a drawbar, and turn controlling mechanism which affords a gate hinge connection between the trailing and pulling vehicles constraining the trailing vehicle to swing about alternate pivots spaced a distance laterally from the drawbar and at opposite sides thereof so that each pivot when operative, will lie between the axis of the drawbar and the center of the turn being negotiated.

A further purpose of this invention resides in the provision of draft gear of the character described which embodies means for supporting the front end of the trailing vehicle, and hence is especially well suited for use with so-called semi-trailer combinations.

With the above and other objects in view, which appear as the description proceeds, this invention resides in the novel construction, combination and arrangement of parts substantially as hereinafter described and more particularly defined by the appended claims, it being understood that such changes in the precise embodiment of the hereinafter disclosed invention may be made as come within the scope of the claims.

The accompanying drawings illustrate one complete example of the physical embodiment of the invention constructed in accordance with the best mode so far devised for the practical application of the principles thereof, and in which:

Figure 1 is a side elevation view of a truck trailer combination close coupled together by the draft gear of this invention;

Figure 2 is a plan view of the truck trailer combination shown in Figure 1;

Figure 3 is an enlarged fragmentary plan view illustrating the draft gear of this invention with the component parts thereof in the positions they occupy during straight-away travel of the truck trailer combination;

Figure 4 is a view similar to Figure 3 but illustrating the manner in which the draft gear controls the turning movements of the trailing vehicle during a right-hand turn;

Figure 5 is a detail sectional view taken through Figure 3 along the plane of the line 5—5;

Figure 6 is a detail sectional view taken through Figure 3 along the plane of the line 6—6; and Figure 7 is a detail sectional view taken through Figure 6 along the plane of the line 7—7.

Referring now particularly to the accompanying drawings in which like numerals designate like parts throughout the several views, the numeral 5 generally designates the draft gear of this invention. The draft gear 5 may be used to couple together any of a wide variety of road vehicles, but as shown in Figures 1 and 2 by way of illustration, provides the hitch for close coupling the truck and trailer components 6 and 7 respectively of an automobile transporting device such as shown and described in my copending application Serial No. 187,907 filed October 2, 1950, and entitled Articulated Vehicle Transporting Device.

As will appear in greater detail hereinafter the draft gear 5 of this invention is especially well suited for use with such automobile transpotring devices since it allows the truck and trailer components thereof to be coupled together as closely as possible while precluding objectionable side throw of the trailer in negotiating turns, and at the same time effecting a degree of longitudinal separation of the truck and trailer during turning thereof which provides the necessary turning clearance between the close coupled units.

The draft gear of this invention may be said to comprise a drawbar, generally designated 9, and turn controlling mechanism generally designated 10. The trailer, of course, is pulled through the drawbar 9, while the turn controlling mechanism 10 is independent of the drawbar in the sense that none of the draft load is imposed thereon.

The drawbar 9 is of the longitudinally extensible type, and comprises a strong coiled expansion spring 11, a drawbar section 12 having spaced apart parallel arms 13 projecting loosely through the spring from one end thereof, and a rod-like drawbar section 14 having one end portion projecting through the spring from the other end thereof and loosely received between the arms 13 of the drawbar section 12. The spring 11 is held compressed slightly between a cross head 16 fixed to the rod-like section 14 and projecting laterally out from between the bars 13, and a cup 17 fixed to the extremities of the arms remote from the cross head 16. By this connection the compression spring acts as a tensioning device tending to draw the opposite ends of the drawbar toward one another to a retracted position; and when the drawbar is connected between the truck 6 and the trailer 7, the spring 11 accordingly yieldingly resists the load of the trailer and the latter is, in fact, pulled through the spring.

The drawbar is connected between the rear end of the truck and the front end of the trailer, to lie along the longitudinal center line of these units when the same are aligned, by swivel connections provided by substantially hemispherical washers 19 on the opposite ends of the drawbar. These washers have their convex surfaces received in concave seats 20 and 21 on the rear of the truck and the front of the trailer respectively. It is understood, of course, that the ends of the drawbar project through the seats 20 and 21 and are threaded to receive retaining and adjusting nuts 22 by which the washers 19 are retained in place upon the drawbar and the tension of the spring 11 may be regulated.

The drawback seat 20 on the truck is preferably spaced a distance forwardly of the rear transverse member 24 at the bottom of the truck body, and at a level slightly lower than that of the member 24, and is joined thereto by opposite forwardly converging and downwardly slanting arms 25 welded or otherwise fixed to the member 24. The drawbar seat 21 on the trailer is fixed in the lower transverse member 27 at the front of the trailer, the member 27 being lower than the transverse member 24 on the truck and the seats 20 and 21 being thus positioned to hold the drawbar in a substantially horizontal position.

The hemispherical washers 19 and their seats 20 and 21 permit universal swiveling of the ends of the drawbar; while the extensibility of the drawbar allows the trailer to move longitudinally away from the back of the truck out of a position relatively close thereto toward which it is yieldingly urged by the drawbar spring 11.

The turn control mechanism 10 of this invention provides in effect a gate hinge connection between the truck and the trailer since it enables the trailer to swing relative to the truck about alternate transversely spaced pivots on the truck during turning thereof.

The movable portion of this gate hinge comprises a substantially T-shaped member 29 carried by the trailer. The stem 30 of the T has its extremity abutting and rigidly fixed to the medial portion of the transverse element 27 of the trailer, and the stem projects forwardly over the drawbar along the longitudinal center line of the trailer. The beam-like head 31 of the T is parallel to the transverse element 27 of the trailer and extends horizontally across the intermediate portion of the drawbar 9. The ends of the head 31 have rollers 32 journalled thereon for rotation on a common axis perpendicular to the stem and these rollers comprise the alternate "pivot posts" of the gate hinge.

The rollers 32 are received in opposite channel-shaped tracks 33 fixed on the back of the transverse member 24 of the truck and projecting horizontally rearwardly therefrom. These tracks are located equal distances from the longitudinal center line of the truck and comprise the stationary portion of the gate hinge connection between the truck and trailer.

As shown best in Figure 3, the closed forward ends of the tracks are transversely spaced a distance substantially corresponding to the spacing of the rollers 32, and provide open bearings. When the truck and trailer are longitudinally aligned, the rollers are normally urged into the bearings provided by the closed forward ends of the tracks, toward engagement with the back of the transverse member 24, by the action of the drawbar spring 11 upon the trailer. The tracks, however, converge uniformly toward their rear or outer ends along arcs the centers of which lie approximately on the back of the transverse member 24 of the truck. Since the radii of these arcs substantially correspond to the length of the head 31 of the T either rollered end of the head can swing rearwardly in its track out of its bearing about the roller at the opposite end of the head in gate hinge fashion.

The rollers 32, of course, rest upon the lower flanges of the channels 33 so that the weight of the front end of the trailer 7 is borne by the rear end portion of the truck; and the rear ends of the tracks are closed as at 35 to limit rearward swinging of the head 31.

Thus it will be seen that because of the disposition of the bearings with respect to the drawbar and its connections with the truck and trailer, the latter is constrained to pivot about whichever roller 32 lies closer to the center of a turn negotiated by the truck trailer combination, regardless of the direction of the turn.

Since the T-shaped member is substantially floatingly connected with the truck in the manner of a gate hinge, therefore, the joint about which the vehicles articulate in negotiating a turn will always lie between the drawbar axis and the center of the turn, and a distance to one side of the drawbar corresponding approximately to one-half the length of the beam or head 31.

As noted hereinbefore, the spring 11 of the drawbar tends to hold both of the rollers 32 closely adjacent to or even against the back of the transverse element 24 on the truck, in other words in the bottoms of their respective bearings, when the vehicles are aligned as shown in Figure 2. In negotiating a right hand turn (see Figure 4), the roller 32 at the right-hand end of the head 31 remains in its bearing to provide the joint about which the vehicles articulate, while the opposite roller "rides" toward the rear of its channel-shaped track 33. Hence, the right hand roller establishes a pivot connection between the truck and the trailer closer to the center of the turn than either of the universal joint connections between the drawbar and the vehicles, and which by its laterally offset position relative to the drawbar effects longitudinal separation of the truck and trailer against the action of the drawbar spring 11, with consequent extension of the draw bar.

Also by reason of the pivotal joint thus established between the truck and the trailer, the side throw of the trailer is minimized which, of course, is desirable since it has the effect of providing greater assurance that the trailer will follow in the path of the truck during turning, and eliminates the tendency of the trailer to cut inside the turn negotiated by the truck.

During a left-hand turn the roller 32 at the left-hand end of the beam 31 on the T-shaped member remains in its socket while the right hand roller "rides" rearwardly away from the back of the truck; so that the joint about which the vehicles articulate is again spaced to the side of the drawbar axis which is closer to the center of the turn. Obviously, the drawbar 9 is again extended against the action of its spring 11, while the trailer follows closely around the turn in the path of the truck.

The extent to which the ends of the head or beam 31 of the T-shaped member swing, of course, depends upon the length of the channel-shaped tracks 33; and it is to be appreciated that wherever conditions will permit, somewhat longer tracks than those shown in the drawings may be used to advantage.

At their forward bearing forming ends, the channels which provide the tracks 33 have pads 37 fixed to their webs to lie directly alongside the rollers 32 in the aligned positions of the vehicles. These pads limit endwise motion of the head 31, transversely of the truck, and also serve as wear plates which are engaged by the rollers, as they pivot in their bearings during turning of the vehicles.

Although the head 31 of the T-shaped member 29 has its ends confined in the channel-shaped tracks 33, the trailer 7 is nevertheless allowed to twist about the axis of the stem 30 to facilitate travel over uneven road surfaces. For this purpose the stem 30 has a special connection with the head 31 comprising a tube 39 fixed on the forward end of the stem 30 and projecting into a clamp structure 40 on the head, with a rubber sleeve 41 confined between the clamp and the tube 39 to permit twisting and turning movement of the tube and consequently the stem 30 relative to the head 31.

Diagonal braces 42 connected between the sides of the stem 30 and the underside of the head 31 near its ends effect a stabilizing influence upon the resilient connection between the head and the stem, and serve to hold the head 31 in perpendicular relationship to the stem. The braces 42 are in the nature of links having apertured ends to loosely receive parallel studs 44 on each side of the stem and head; and rubber sleeves 45 are confined in the apertures of the braces to firmly but yieldingly grip the studs. Consequently, the diagonal braces 42 can pivot slightly upon their studs to allow the trailer and the stem 30 to twist relative to the head 31, about the axis of the stem, while their angular disposition largely precludes horizontal oscillatory movement of the head about its connection with the stem.

It will be apparent that with the turn controlling mechanism shown, the alternate joints about which the vehicles articulate in negotiating turns lie equal distances to opposite sides of the longitudinal center line of the truck, and approximately midway between the center line and the sides of the truck body. Consequently, when turning, the small amount of side throw of the trailer as indicated in dot and dash lines in Figure 2 is negligible.

Attention is directed to the fact that the draft gear of this invention does not necessarily require the truck 6 and the trailer 7 to be spaced apart as great a distance as that shown in the drawings. This space, however, is necessary in the particular automobile transporting device chosen for illustration for the reason that the nose 50 of the rearmost vehicle on the truck 6 overhangs the back of the truck, as indicated in Figure 1, requiring turning clearance between the trailer and the nose of the automobile as well as between the truck and trailer. In other words wherever the load on either the truck or the trailer does not need to be taken into consideration from the standpoint of turning clearance, the truck and trailer may be coupled together by the draft gear of this invention with even less space therebetween without interference with one another during turning.

From the foregoing description taken together with the accompanying drawings it will be readily apparent to those skilled in the art that this invention provides an improved manner of coupling a truck with a trailer and for controlling the turning movements of the trailer relative to the truck so that the trailer will follow as closely as possible along the path traveled by the truck in negotiating a turn; and that the longitudinal separation effected by the truck and trailer during turning thereof assures that there will be adequate turning clearance between the coupled vehicles at all times.

What I claim as my invention is:

1. Draft gear for coupling a trailer to a truck, comprising: a longitudinally extensible drawbar extending lengthwise between the front of the trailer and the rear of the truck; swivel connections between the ends of said drawbar and the truck and trailer; spring means for yieldingly resisting extension of the drawbar and through which the trailer is pulled; a beam carried by the trailer and extending horizontally across the drawbar with the ends of the beam disposed equal distances from the opposite sides of the drawbar; transient fulcrum connections between the ends of the beam and the truck normally maintained operative by the action of the drawbar spring upon the vehicles and providing for swinging of either end of the beam away from the rear of the truck about the fulcrum connection at the opposite end of the beam in consequence of the vehicles negotiating a turn, whereby the joint about which the truck and trailer articulate in negotiating a turn may lie between the axis of the drawbar and the center of the turn regardless of the direction of the turn; and means on the truck for supporting the beam in any position thereof and upon which the weight of the front of the trailer is imposed.

2. Draft gear for coupling a trailing road vehicle to a leading road vehicle and for supporting the front end of said trailing vehicle, comprising: a longitudinally extensible drawbar projecting lengthwise between the front of the trailing vehicle and the rear of the leading vehicle; swivel connections between the ends of said drawbar and the vehicles; spring means for yieldingly resisting extension of the drawbar and through which the trailing vehicle is pulled; a substantially T-shaped member interposed between said vehicles with its head extending horizontally across the drawbar and adjacent to one of said vehicles and with its stem in substantially superimposed relationship with the drawbar and projecting toward the other of said vehicles; a rigid connection between said other vehicle and the stem of said T-shaped member; open bearing means on said first designated vehicle cooperable with the ends of said head to define alternate transient hinge connections between the vehicles by which either end of the head of the T-shaped member may pivot in its bearing while the other end thereof may swing out of its bearing and away from said first designated vehicle; and arcuate tracks on said first designated vehicle in which the ends of said head are received to constrain the T-shaped member to horizontal swinging motion about the hinge connection at either end of the head thereof.

3. The draft gear set forth in claim 2 wherein rollers mounted on the ends of the head of the T-shaped member cooperate with said arcuate tracks to facilitate swinging motion of the T-shaped member about the hinge connection at either end of the head thereof.

4. The draft gear set forth in claim 2 further characterized by the provision of means including the stem of the T-shaped member connecting the head of the T-shaped member with said other vehicle and providing for relative oscillatory motion between the vehicles about the axis of said stem.

5. Draft gear for leading and trailing road vehicles, comprising the combination of: means defining an endwise yieldable drawbar pivotally connected between the adjacent ends of the vehicles and providing the sole means by which the trailing vehicle is pulled by the leading vehicle; and a turn controlling device for the trailing vehicle independent of said drawbar and comprising means on one of the vehicles defining a pair of open bearings spaced transversely from one another and from the longitudinal centerline of said first designated vehicle, and means on the other vehicle defining a pair of pivots cooperable with said bearings and each movable away from the adjacent end of the first designated vehicle and its cooperating bearing in consequence of longitudinal misalignment of the vehicles in negotiating a turn in one direction to constrain the vehicles to relative pivotal motion about the other pivot in its cooperating bearing, so that said bearings and pivots provide alternate transient fulcrum connections between the vehicles in negotiating turns, assuring relative pivotal motion therebetween about an axis which lies between the center of the turn and the longitudinal centerlines of the vehicles regardless of the direction of the turn.

6. Draft gear for leading and trailing road vehicles, comprising the combination of: means including a resilient member defining an endwise yieldable and pivotal draft connection between the adjacent ends of the vehicles and providing the sole means by which the trailing vehicle is pulled by the leading vehicle, the resilient member of said draft connection yieldingly resisting relative separating motion of the vehicles; and a turn controlling device for the trailing vehicle comprising means on one of the vehicles defining a pair of open bearings spaced transversely from one another and from the longitudinal centerline of said first designated vehicle; and means on the other vehicle defining a pair of pivots normally biased toward fulcruming positions in said bearings by the action of said resilient member on the vehicles, and either of said pivots being movable away from the adjacent end of the first designated vehicle and its cooperating bearing against the action of said resilient member in consequence of longitudinal misalignment of the vehicles in negotiating a turn in one direction to constrain the vehicles to relative pivotal motion about the fulcrum provided by the engagement of the other pivot in its cooperating bearing, so that said bearings and pivots provide alternate transient fulcrum connections between the vehicles assuring relative pivotal motion therebetween about an axis which lies between the center of the turn and the longitudinal centerlines of the vehicles regardless of the direction of the turn.

7. Draft gear for coupling two road vehicles comprising: a longitudinally extensible drawbar projecting lengthwise between the front of the trailing vehicle and the rear of the vehicle ahead of it; swivel connections between the ends of said drawbar and the vehicles; resilient means for yieldingly resisting extension of the drawbar and through which the trailing vehicle is pulled; and turn controlling means independent of said drawbar for governing the turning of the trailing vehicle, comprising a beam carried by one of said vehicles and extending transversely of the drawbar axis with its ends disposed at laterally opposite sides thereof, and cooperating transient fulcrum defining means on the ends of said beam and on the other of said vehicles positioned to limit relative motion of the vehicles toward one another under the influence of the resilient means of the drawbar and to provide for swinging motion of either end of the beam away from said other vehicle in consequence of longitudinal misalignment of the vehicles produced by negotiating a turn, about the fulcrum defining means at the opposite end of the beam, whereby the fulcrum about which the vehicles articulate in negotiating turns lies between the axis of the drawbar and the center of the turn regardless of the direction of the turn.

8. Draft gear for coupling two road vehicles comprising: a longitudinally extensible drawbar projecting lengthwise between the front of the trailing vehicle and the rear of the vehicle ahead of it; swivel connections between the ends of said drawbar and the vehicles; resilient means for yieldingly resisting extension of the drawbar and through which the trailing vehicle is pulled; and a hinge connection between said vehicles comprising a hinge member fixed to one of the vehicles, a cooperating hinge member fixed to the other of said vehicles so as to be movable therewith relative to the first designated hinge member in consequence of said vehicles negotiating turns, and a pair of pivot posts on one of said hinge members disposed equal distances to opposite sides of the longitudinal centerline of the vehicles (when the vehicles are aligned), said posts being transiently engageable in open bearings on the other hinge member, thereby to establish alternate transient fulcrum connections between the members at all times permitting either of the pivot posts to be carried into and out of its bearing by swinging of the relatively movable hinge member about the other pivot post in its bearing.

9. Draft gear for coupling a trailing road vehicle to another road vehicle ahead of it, comprising: a longitudinally extensible drawbar extending lengthwise between the front of the trailing vehicle and the rear of the vehicle ahead of it; swivel connections between the ends of said drawbar and the vehicles; resilient means for yieldingly resisting relative motion between the vehicles tending to extend the drawbar, and through which the trailing vehicle is pulled; turn controlling means independent of said drawbar for governing the turning of the trailing vehicle, comprising, a beam carried by one of said vehicles and extending horizontally across the drawbar with its ends at opposite sides of and spaced from the drawbar, and fulcrum connections between the ends of the beam and the other of said vehicles comprising bearing means on said other vehicle transiently engageable by the ends of the beam to provide for swinging of either end of the beam away from said other vehicle about the fulcrum connection provided by the engagement of the opposite end of the beam with its bearing means, whereby the joint about which the vehicles articulate in negotiating a turn may lie between the axis of the drawbar and the center of the turn regardless of the direction of the turn; and means on said other vehicle for supporting the ends of the beam when the same are moved out of their bearing means.

10. Draft gear for coupling a trailing vehicle to a leading vehicle comprising: a longitudinally extensible drawbar extending lengthwise between the front of the trailing vehicle and the rear of the leading vehicle; swivel connections between the ends of said drawbar and the vehicles; spring means for yieldingly resisting extension of the drawbar and through which the trailing vehicle is pulled; a stem fixed to one of said vehicles and projecting longitudinally over the drawbar toward the other of said vehicles; a beam carried by the stem remote from said fixed end thereof and extending horizontally across the drawbar with the ends of the beam lying at opposite sides of and spaced laterally from the drawbar; supporting means for the beam fixed to the other of said vehicles and having flat substantially horizontal supporting surfaces underlying the ends of said beam; rollers on the ends of the beam resting upon said supporting surfaces; and open bearing means on the other of said vehicles each positioned to receive one of said rollers to provide for swinging of the other end of the beam away from said other vehicle, whereby the joint about which the vehicles articulate in negotiating a turn may lie between the axis of the drawbar and the center of the turn regardless of the direction of the turn.

References Cited in the file of this patent

UNITED STATES PATENTS

| | | |
|---|---|---|
| 856,795 | Morris | June 11, 1907 |
| 1,173,479 | Buckman | Feb. 29, 1916 |
| 1,277,187 | Bulley | Aug. 27, 1918 |
| 2,552,885 | Claud-Mantle | May 15, 1951 |

FOREIGN PATENTS

| | | |
|---|---|---|
| 211,256 | Great Britain | Nov. 27, 1922 |